United States Patent
Barwicz et al.

(10) Patent No.: US 9,645,312 B2
(45) Date of Patent: May 9, 2017

(54) REBALANCED ADIABATIC OPTICAL POLARIZATION SPLITTER

(71) Applicant: INTERNATIONAL BUSINESS MACHINES CORPORATION, Armonk, NY (US)

(72) Inventors: Tymon Barwicz, Yorktown Heights, NY (US); Wesley D. Sacher, Mississauga (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/808,511

(22) Filed: Jul. 24, 2015

(65) Prior Publication Data
US 2017/0023735 A1   Jan. 26, 2017

(51) Int. Cl.
| | |
|---|---|
| *G02B 6/126* | (2006.01) |
| *G02B 6/27* | (2006.01) |
| *G02B 27/28* | (2006.01) |
| *G02B 6/132* | (2006.01) |
| *G02B 6/12* | (2006.01) |

(52) U.S. Cl.
CPC ............ *G02B 6/126* (2013.01); *G02B 6/132* (2013.01); *G02B 6/2773* (2013.01); *G02B 27/283* (2013.01); *G02B 2006/1215* (2013.01)

(58) Field of Classification Search
CPC .............................. G02B 6/126; G02B 6/2773
See application file for complete search history.

(56) References Cited

U.S. PATENT DOCUMENTS

| | | | |
|---|---|---|---|
| 6,411,752 B1 | 6/2002 | Little et al. | |
| 7,072,532 B2 | 7/2006 | Watts | |
| 7,373,042 B2 | 5/2008 | Little | |
| 7,499,610 B2* | 3/2009 | Little | G02B 6/126 385/11 |
| 8,855,449 B1* | 10/2014 | Roth | G02B 6/2773 385/11 |
| 8,923,665 B2 | 12/2014 | Barwicz et al. | |
| 8,948,549 B2* | 2/2015 | Picard | G02B 6/1228 385/11 |
| 9,075,251 B2* | 7/2015 | Dwivedi | G02B 6/1225 |
| 2005/0254128 A1* | 11/2005 | Watts | G02B 6/126 359/558 |
| 2006/0198566 A1* | 9/2006 | Watts | G02B 6/126 385/11 |

(Continued)

OTHER PUBLICATIONS

Xiong et al. ("Integrated polarization rotator/converter by stimulated Raman adiabatic passage", Optics Express, Jul. 15, 2013, vol. 21, No. 14, pp. 17097-17107).*

(Continued)

*Primary Examiner* — Michelle R Connelly
(74) *Attorney, Agent, or Firm* — Tutunjian & Bitetto, P.C.; Vazken Alexanian

(57) ABSTRACT

A polarization splitter/combiner and method of forming the same includes a first waveguide having a direction of propagation in a first direction. The height of the first waveguide is greater than the width of the first waveguide. A second waveguide is in proximity to the first waveguide and has a direction of propagation substantially parallel to the first direction in an interaction region. The second waveguide includes a first portion having a greater than the width of the first portion and a second portion having a width greater than a height of the second portion.

19 Claims, 7 Drawing Sheets

(56) References Cited

U.S. PATENT DOCUMENTS

| | | | | |
|---|---|---|---|---|
| 2007/0286552 | A1* | 12/2007 | Aalto | G02B 6/125 385/50 |
| 2008/0152277 | A1* | 6/2008 | Little | G02B 6/126 385/11 |
| 2010/0074571 | A1* | 3/2010 | Gomyo | G02B 6/126 385/11 |
| 2013/0077911 | A1 | 3/2013 | Doerr | |
| 2014/0133796 | A1* | 5/2014 | Dong | G02B 6/126 385/11 |
| 2014/0270628 | A1* | 9/2014 | Barwicz | G02B 6/126 385/14 |
| 2015/0003782 | A1* | 1/2015 | Oka | G02B 6/2804 385/42 |
| 2015/0338577 | A1* | 11/2015 | Shi | G02B 6/126 385/11 |

OTHER PUBLICATIONS

Guan et al. ("CMOS-compatible highly efficient polarization splitter and rotator based on a double-etched directional coupler", Optics Express, Feb. 10, 2014, vol. 22, No. 3, pp. 2489-2496).*

Watanabe et al. ("Demonstration of Mode-Evolutional Multiplexer for Few-Mode Fibers Using Stacked Polymer Waveguide", IEEE Photonics Journal, Dec. 2015, vol. 7, No. 6).*

Su et al. (Four-port integrated polarizing beam splitter, Optics Letters, Feb. 15, 2014, vol. 39, No. 4, pp. 965-968).*

Xing et al. ("Design of polarization-independent adiabatic splitters fabricated on silicon-on-insulator substrates", Optics Express, Nov. 4, s2013, vol. 21, No. 22, pp. 26729-26734).*

H. Fukuda et al., "Silicon photonic circuit with polarization diversity," Optics Express, vol. 16, No. 7, pp. 4872-4880, Mar. 2008.

D. Taillaert et al., "A Compact Two-Dimensional Grating Coupler Used as a Polarization Splitter," IEEE Photonics Technology Letters, vol. 15, No. 9, pp. 1249-1251, Sep. 2003.

T. Barwicz et al., "Polarization-transparent microphotonic devices in the strong confinement limit," Nature Photonics, vol. 1, pp. 57-60, Jan. 2007.

W. D. Sacher et al., "Polarization rotator-splitters in standard active silicon photonics platforms," Optics Express, vol. 22, No. 4, pp. 3777-3786, Feb. 2014.

S. M. Garner et al., "Vertically Integrated Waveguide Polarization Splitters Using Polymers," IEEE Photonics Technology Letters, vol. 11, No. 7, pp. 842-844, Jul. 1999.

* cited by examiner

REBALANCED ADIABATIC OPTICAL POLARIZATION SPLITTER

BACKGROUND

Technical Field

The present invention relates to optical polarization splitters and, more particularly, to polarization splitters operating on telecommunication wavelengths.

Description of the Related Art

Photonic structures can be fabricated on wafer chips in order to create wafers that operate both in an electronic domain and an optical domain. When an optical fiber is used to input light into a waveguide on a wafer chip, care must be taken to properly manage the polarization of light. The orientation of the polarization state in an optical fiber changes randomly with time. The performance of photonic devices on wafer chips is very sensitive to the orientation of the polarization state. Hence, the input polarization state must be processed on the wafer chip for it to be re-oriented into the polarization state for which the photonic devices work the best. To achieve such polarization re-orientation, a polarization splitter and rotator (PSR) is used.

Polarization management is a key technology in integrated photonic circuits. Two orthogonal polarizations of a signal are separated and treated separately on-chip. There are several different designs that are used to split the polarizations using on-chip photonic structures and waveguides, each with distinct disadvantages.

In a first polarization splitter, known as a directional coupler, a vertical polarization (denoted as "TM" for the "transverse magnetic" mode in a waveguide) couples more strongly with a splitter waveguide than a horizontal polarization (denoted as "TE" for the "transverse electric" mode). By bringing the input waveguide into proximity with the splitter waveguide, the TM polarization is removed from the input waveguide and propagates within the splitter waveguide, while the TE mode continues in the input waveguide. However, these structures have a narrow optical bandwidth, high sensitivity to fabrication imperfections, and obtaining low crosstalk necessitates cascading many directional couplers.

A second polarization splitter, known as a grating coupler, introduces a signal in a direction perpendicular to the split outputs through a grating. The TE and TM polarizations are scattered in different directions by the grating. This enables vertical coupling to the optical fiber, but again is limited in optical bandwidth and is sensitive to the grating dimensions.

A third polarization splitter, shown in a top-down diagram in FIG. 1, is known as a mode-evolution polarization splitter and uses two waveguides of differing thickness. A first waveguide 102 has a vertical size that is relatively larger than that of a second waveguide 104, while having a horizontal size that is relatively narrower. As the horizontal width of the first waveguide 102 is increased, TM polarized light (shown as a dashed line) becomes confined there while TE polarized light (shown as a solid line) remains confined in the second waveguide. This structure is relatively broadband and tolerant to variations in waveguide dimensions. However, when integrated into a microelectronic fabrication process and operating at the short-end of telecommunication wavelengths (e.g., in the 1.2 to 1.3 micrometer range), the point at which the TM input crosses from the second waveguide 104 to the first waveguide 102 is very sensitive to fabrication variation of waveguide 102 and appears close to a minimum feature size that can be reliably fabricated. For example, the splitter may not function correctly if the first waveguide 102 is a mere 20 nm too large.

SUMMARY

A polarization splitter/combiner includes a first waveguide having a direction of propagation in a first direction, wherein a height of the first waveguide is greater than a width of the first waveguide. A second waveguide is disposed in proximity to the first waveguide and has a direction of propagation substantially parallel to the first direction in an interaction region. The second waveguide includes a first portion having a height greater than its width and a second portion having a width greater than its height.

A method for forming a polarization splitter/combiner includes forming a lower layer of a first and second waveguide on a substrate. An upper layer of the first and second waveguide is formed on the respective lower layer of the first and second waveguide. The combined height of the lower and upper layer of the first waveguide is greater than a width of the first waveguide. The upper layer of the second waveguide has a substantially smaller width than a width of the lower layer of the second waveguide.

A method of beam splitting includes modifying an effective index of refraction of a first waveguide carrying a first signal having a first polarization and a second signal having a second polarization that is orthogonal to the first polarization by introducing a top layer to the first waveguide that is narrower than the first waveguide. The first waveguide is coupled with a second waveguide having a height that is taller than the first waveguide and a width that is narrower than the first waveguide to split the second signal into the second waveguide. The first and second waveguides are decoupled after the polarizations have split. The top layer of the first waveguide is removed.

A method of beam combining includes modifying an effective index of refraction of a first waveguide carrying a first signal having a first polarization by introducing a top layer to the first waveguide that is narrower than the first waveguide. The first waveguide is coupled with a second waveguide having a height that is taller than the first waveguide and a width that is narrower than the first waveguide to combine a second signal in the second waveguide with the first signal in the first waveguide. The second signal has a second polarization that is orthogonal to the first polarization. The first and second waveguides are decoupled after the polarizations have combined. The top layer of the first waveguide is removed.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present principles provide on-chip polarization splitters that use two-layer waveguides to control polarization. The horizontal widths of the respective layers of the two waveguides are controlled over the length of the interaction region of the waveguides to enhance splitting of the two polarizations.

Figure 1:
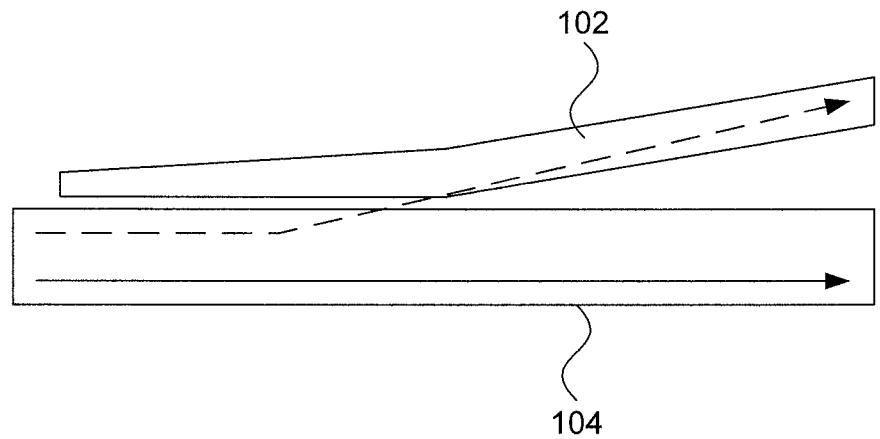
FIG. 1 is a diagram of a prior art polarization splitter.
Figure 2:
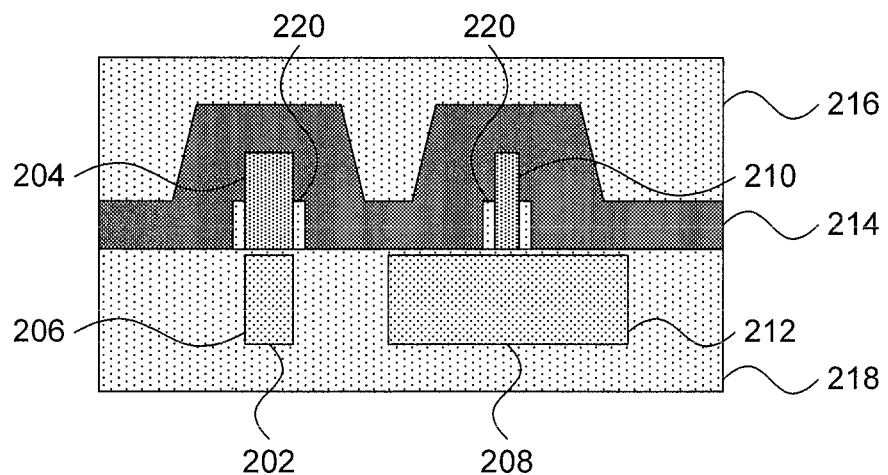
FIG. 2 is a cross-sectional diagram of a polarization splitter in accordance with the present principles.

Referring now to FIG. 2, a cross-sectional diagram of a polarization splitter is shown. A first waveguide 202 and a second waveguide 208 are shown. Each waveguide is formed of two layers, the horizontal dimensions of which change over the length of the waveguides. A bottom layer, forming portions 206 and 212 of the first and second waveguides respectively, may be formed from, e.g., crystalline silicon and may have an exemplary vertical thickness between about 50 nm and about 300 nm, with one specific embodiment having a thickness of about 150 nm. A second layer, forming portions 204 and 210 of the first and second waveguides respectively, may be formed from, e.g., polycrystalline silicon and may have an exemplary vertical thickness between about 30 nm and about 300 nm, with one specific embodiment having a thickness of about 150 nm. This allows for compatibility with existing manufacturing technologies, where the bottom layer is formed as part of a silicon-on-insulator substrate layer and the top layer is formed as part of a gate layer. A dielectric layer 214 is formed from, e.g., silicon nitride over the waveguides 202 and 208 having a vertical thickness between about 1 nm and about 400 nm, with one specific embodiment having a vertical thickness of about 70 nm. A passivating, planarizing layer 216 is formed over the dielectric layer 214. The planarizing layer 216 is formed with a dielectric material having a refractive index between about 1.33 and about 1.65 at a vertical thickness between about 1 nm and about 1,000 nm, with one specific embodiment having a thickness of about 500 nm. In one specific example, the planarizing layer 216 is formed from borophosphosilicate glass.

The lower portions of the waveguides 206 and 212 are formed in an oxide layer 218 having an exemplary vertical thickness of about 550 nm to about 5,300 nm that may be formed on a suitable substrate that may include, e.g., a silicon wafer (not shown). A thin layer of oxide material 218 may remain over the lower layers of the waveguides 206 and 212, having an exemplary vertical thickness between about 1 m to about 10 nm, with one specific embodiment having a vertical thickness of about 2 nm. The oxide 218 may also extend upward along the sidewalls of the upper layers 204 and 210 of the waveguides to form oxide walls 220, having an exemplary horizontal width of about 5 nm to about 50 nm, with one specific embodiment having a horizontal width of about 20 nm, and having an exemplary vertical thickness of about 25% to about 75% the vertical thickness of the upper layers 204 and 210 of the waveguides.

Figure 3:
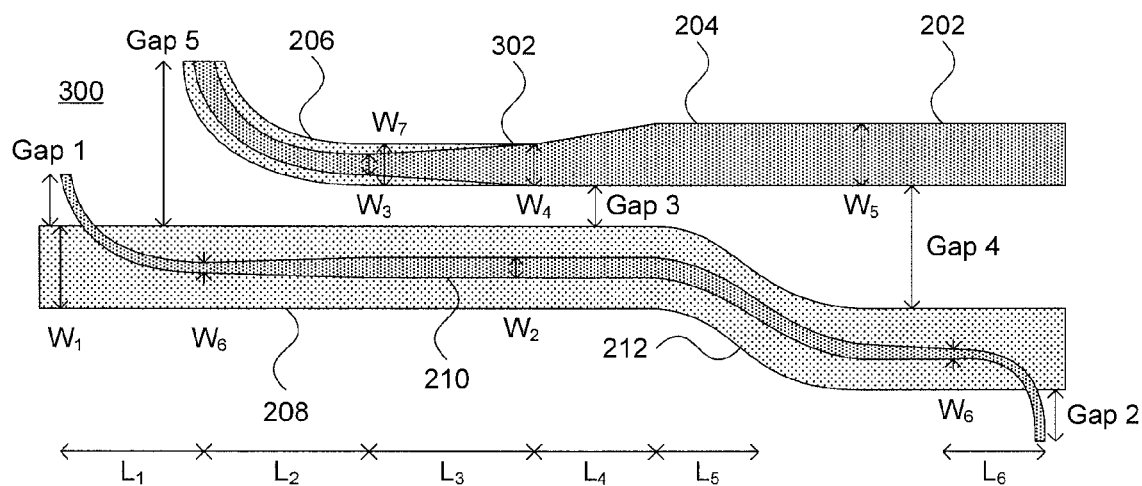
FIG. 3 is a top-down diagram of a polarization splitter in accordance with the present principles.

Referring now to FIG. 3, a top-down diagram of a polarization splitter 300 is shown. It should be understood that this structure could also be used as a combiner if the inputs and outputs are reversed. As in FIG. 2, the top and bottom layers of each waveguide are shown, with the addition of the narrow top layer 210. Also shown is how these different structures vary in width over the course of their length. A table of exemplary widths and lengths as illustrated is shown below. Notably the top layer 210 of the second waveguide 208 is narrower at the beginning and end than at $W_2$, being about 60 nm ($W_6$). The top layer 210 of the second waveguide is introduced over the bottom layer 212 slowly to avoid rotating modes and causing crosstalk between the polarized signals. In one exemplary embodiment, it is contemplated that the top layer 210 may be introduced with an initial gap between it and the bottom layer 212 of about 700 nm, with a similar gap when the top layer 210 bends out at the end (Gaps 1 and 2). The first waveguide 202 is itself introduced gradually, with an exemplary bend-in gap of about 700 nm (Gap 5).

TABLE 1

| Dimension of interest | Exemplary size (nm) | Exemplary range (nm) |
| --- | --- | --- |
| $W_1$ | 360 | 200-1000 |
| $W_2$ | 80 | 10-1000 |
| $W_3$ | 60 | 10-1000 |
| $W_4$ | 120 | 15-1000 |
| $W_5$ | 180 | 20-1000 |
| $W_6$ | 60 | 5-1000 |
| $W_7$ | 120 | 25-1000 |
| $L_1$ | 30,000 | 3,000-300,000 |
| $L_2$ | 24,000 | 3,000-300,000 |
| $L_3$ | 50,000 | 500-350,000 |
| $L_4$ | 50,000 | 500-350,000 |
| $L_5$ | 73,000 | 600-400,000 |
| $L_6$ | 158,000 | 400-400,000 |
| Gap 1 | 700 | 1-100,000 |
| Gap 2 | 700 | 1-100,000 |
| Gap 3 | 140 | 5-500 |
| Gap 4 | 700 | >300 |
| Gap 5 | 700 | 5-100,000 |

In an interaction region 302, the width of layer 204 increases from 60 nm to 120 nm and then to 180 nm. In this region, the TM polarization transfers between waveguides. The presence of the layer 212 stands apart from conventional splitters. In the previous understanding of adiabatic polarization splitters, layer 212 would not be present, following the logic that the horizontal polarization (TE) would follow the horizontal waveguide 208 while the vertical polarization (TM) would follow the vertical waveguide 202. In contrast, the present embodiments have superior performance with a second waveguide 208 that, while still being mostly horizontal, still has a vertical component in an "inverse-T" shape, as shown in FIG. 2. It is contemplated that there is a gap of about 140 nm (Gap 3) between the first waveguide 202 and the second waveguide 208 in the interaction region. After the interaction region (or before, in the case of a combiner), it is contemplated that there is a gap between the first waveguide 202 and the second waveguide 208 of about 700 nm (Gap 4).

In some cases the conventional "L" shaped structure is too imbalanced to provide effective polarization splitting, such that a smooth transition of the vertical polarization from the horizontal to the vertical waveguide is not possible. Hence the source waveguide 212 is given a vertical component 210 to rebalance the structure.

Figure 4:
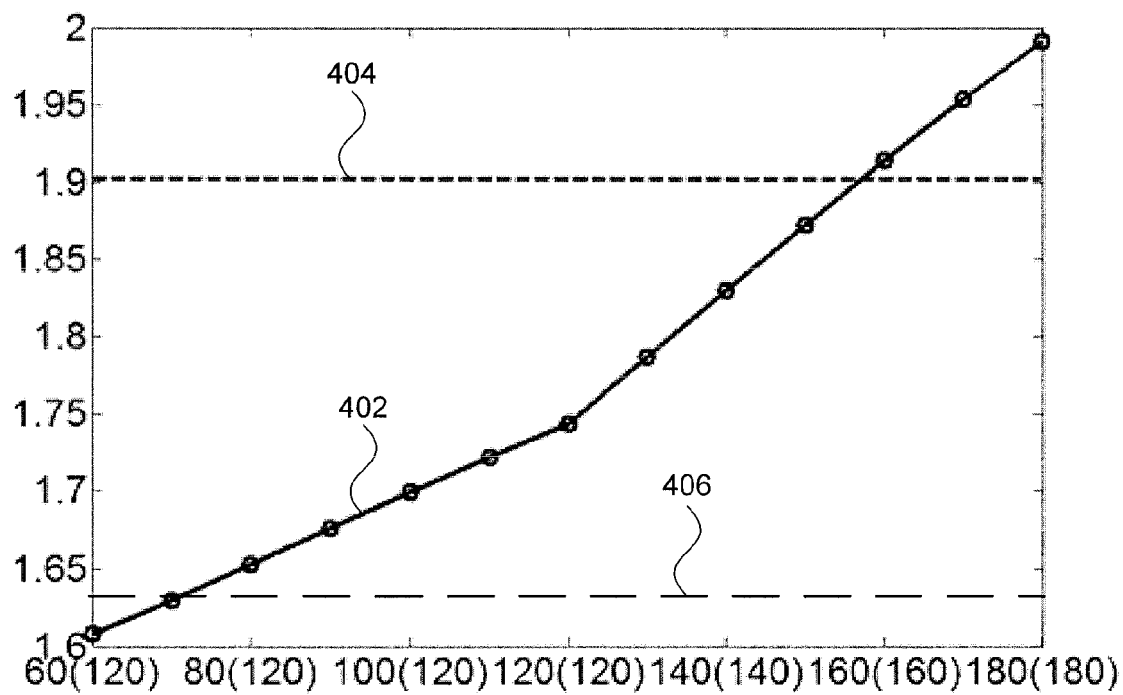
FIG. 4 is a diagram of a crossover point for a transverse magnetic polarized signal according to thickness of respective waveguides and effective index of refraction in accordance with the present principles.

Referring now to FIG. 4, a diagram of the crossover point for the TM signal is shown, with the vertical axis representing the effective index of refraction and the horizontal axis representing the widths in nanometers of the top and bottom layers 204 and 206 of the first waveguide 202, with the latter width shown in parentheses. The effective index of refraction for a given mode represents how favorable the waveguide is to propagation in the mode. The curve 402 shows how the effective index of refraction of the first waveguide 202 changes as the widths change.

Also shown is the effective index of refraction of the second waveguide 208, which has in this region a top layer thickness of 80 nm and a bottom layer thickness of 360 nm. This is illustrated as the dotted line 404 and is contrasted to a similar line 406 for the conventional implementation that lacks the upper layer 210 of the second waveguide. The transition of the polarizations occurs when the effective indices of refraction are about equal. As can be seen, the thickness at which the transition occurs for the present embodiments, shown at the intersection of lines 402 and 404, occurs at nearly 160 nm. In contrast, the thickness at which the transition occurs at the intersection of lines 402 and 406 is much smaller, resulting in device dimensions that are challenging to fabricate cost-efficiently and a greater sensitivity to small (e.g., ~10 nm) differences in width. The present embodiments therefore move the cross-over thickness to be substantially above the minimum feature size, thereby making them significantly easier to fabricate and more robust against typical manufacturing variations.

It is to be understood that the present invention will be described in terms of a given illustrative architecture having a wafer; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should be understood that the present embodiments may be implemented using any appropriate fabrication technology. It is specifically contemplated that the method of fabrication described herein is particularly well suited to integration with common fabrication techniques and lends itself to electronic/photonic chip integration, with photonic components being manufactured using the same processes as electronic components. This greatly simplifies manufacturing, lowering the cost and complexity of the process.

Figure 5:
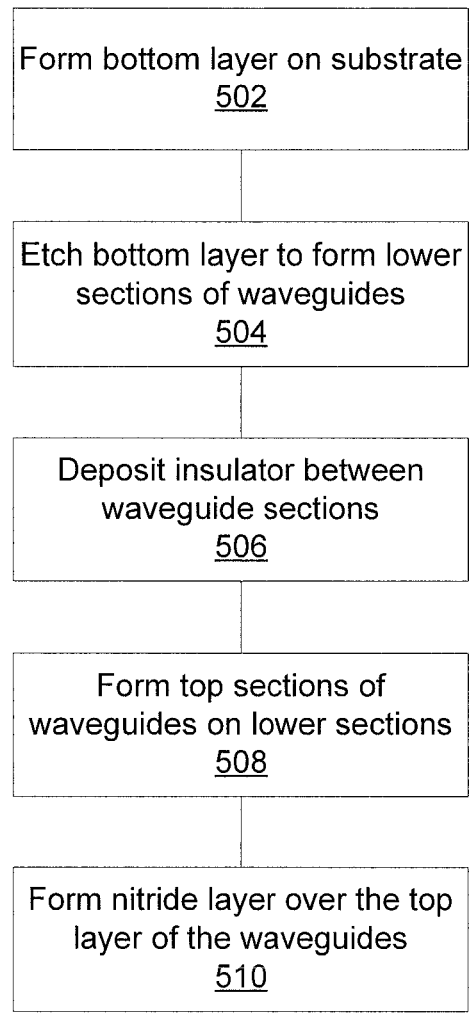
FIG. 5 is a block/flow diagram of a method for forming a polarization splitter in accordance with the present principles.

Referring now to FIG. 5, a method of fabricating a polarization splitter is shown. Block 502 forms the bottom layer of the waveguides in a top layer of a substrate, which may for example be formed from an insulator such as silicon dioxide. The bottom layer is formed using, e.g., a single-crystal semiconductor layer formed from, e.g., silicon, where the material used is selected for its optical properties. Block 502 grows or deposits this bottom layer of silicon on the insulator substrate. Block 504 then etches the bottom layer to form the lower sections of the waveguides. In the embodiments described above, the lower layers 206 and 212 are formed in this fashion. Block 506 deposits insulator between and around the lower waveguide sections 206 and 212. The insulator material is deposited to, or slightly above, the top plane of the lower waveguide sections 206 and 212. If the insulator material is deposited to a level higher than the top plane of the lower waveguide sections, the thickness above the lower waveguide sections may be between about 1 nm and about 10 nm.

Block 508 forms the top layer of the waveguides on the bottom layer. This may be accomplished by depositing a polysilicon layer over the bottom layer, using any appropriate method of deposition including, e.g., low-pressure chemical vapor deposition, rapid thermal chemical vapor deposition, sputtering, or plasma-enhanced chemical vapor deposition to form the structures of the top layers 204 and 210 discussed above. The polysilicon layer may be grown in place or may be deposited as a layer and then etched using, e.g., reactive ion etching. Block 510 forms the nitride layer 214 over the top sections 204 and 210.

Figure 6:
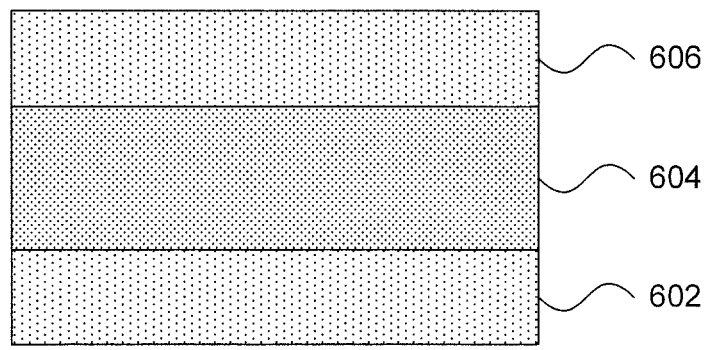
FIG. 6 is a cross-sectional diagram of a step in the formation of a polarization splitter in accordance with the present principles.

Referring now to FIG. 6, a cross-sectional view of a step in forming a polarization splitter is shown. A semiconductor-on-insulator substrate is employed in the embodiment shown, with an insulator 604 being formed on a bulk semiconductor base 602. A semiconductor layer 606 is formed on the insulator layer. It is specifically contemplated that the semiconductor layers 602 and 606 are both crystalline silicon, but it is recognized that they may differ and, in particular, that the top semiconductor layer 606 may be any appropriate material having suitable optical properties. It is specifically contemplated that the insulator layer 604 is a silicon dioxide or other "buried oxide" material.

Figure 7:
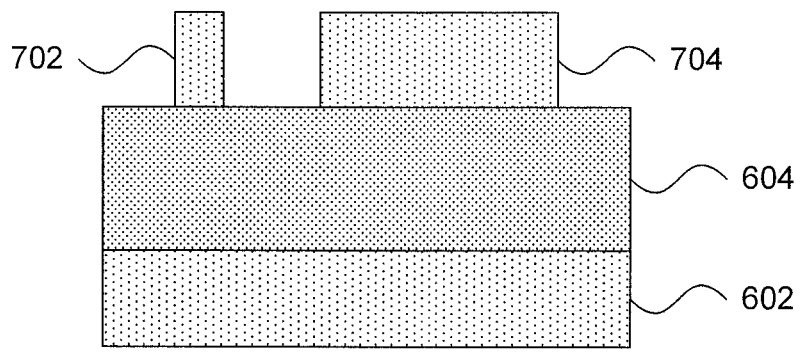
FIG. 7 is a cross-sectional diagram of a step in the formation of a polarization splitter in accordance with the present principles.

Referring now to FIG. 7, a cross-sectional view of a step in forming a polarization splitter is shown. The top semiconductor layer 606 is etched to form two lower-layer waveguides 702 and 704. The waveguides 702 and 704 may be formed by any appropriate mechanism, including the formation of a mask followed by a liquid etch or reactive ion etching. The lower-layer waveguides correspond to waveguide portions 206 and 212 above. As such, the widths of the lower portions of the waveguides 702 and 704 may vary.

Figure 8:
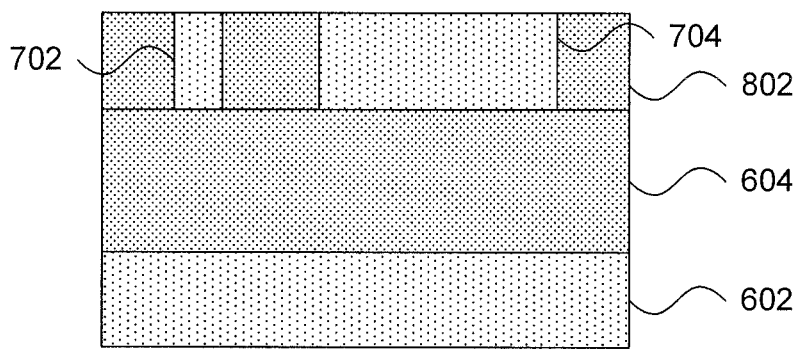
FIG. 8 is a cross-sectional diagram of a step in the formation of a polarization splitter in accordance with the present principles.

Referring now to FIG. 8, a cross-sectional view of a step in forming a polarization splitter is shown. A layer of insulator material 802 is formed around the waveguide sections 702 and 704 and on the substrate insulator layer 604. This insulator layer 802 may be additional silicon dioxide or any other appropriate dielectric material. The insulator layer 802 may be formed by any appropriate deposition, including epitaxial growth, low-pressure chemical vapor deposition, rapid thermal chemical vapor deposition, sputtering, or plasma-enhanced chemical vapor deposition. The insulator layer 802 may be formed to a depth that exceeds the height of the waveguide sections 702 and 704 and then, for example, buffed to reduce irregularities and expose the waveguide sections 702 and 704. In an alternative embodiment, a portion of insulator material (e.g., about 1 mm to about 10 nm) may be left over the waveguide sections 702 and 704.

Figure 9:
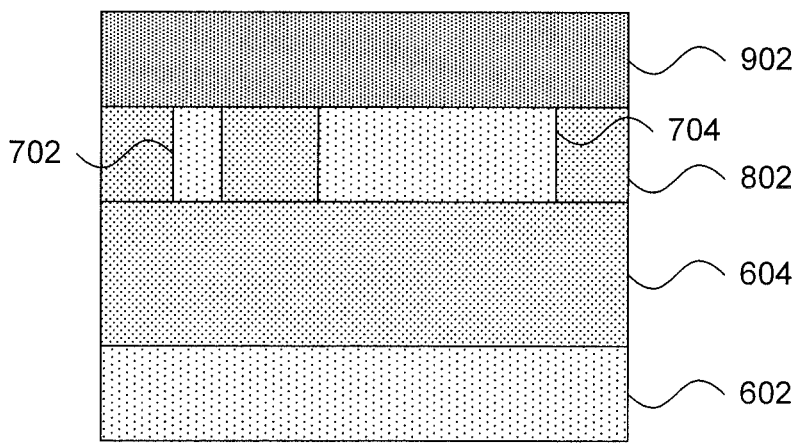
FIG. 9 is a cross-sectional diagram of a step in the formation of a polarization splitter in accordance with the present principles.

Referring now to FIG. 9, a cross-sectional view of a step in forming a polarization splitter is shown. A layer of semiconductor material 902 is formed over the waveguide sections 702 and 704 and the insulator layer 802. It is specifically contemplated that the semiconductor layer 902 is polysilicon, but it is recognized that any appropriate material having suitable optical properties may be used. The semiconductor layer 902 may be formed by any appropriate deposition, including epitaxial growth, low-pressure chemical vapor deposition, rapid thermal chemical vapor deposition, sputtering, or plasma-enhanced chemical vapor deposition.

Figure 10:
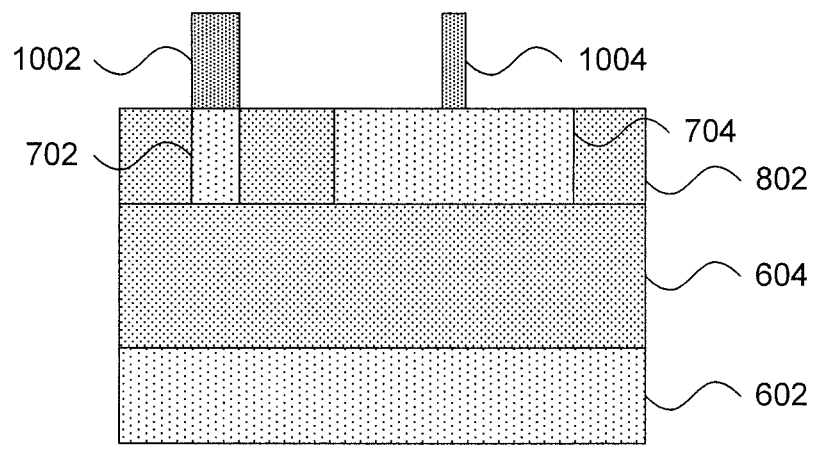
FIG. 10 is a cross-sectional diagram of a step in the formation of a polarization splitter in accordance with the present principles.

Referring now to FIG. 10, a cross-sectional view of a step in forming a polarization splitter is shown. The semiconductor layer 902 is etched to form two upper-layer waveguides 1002 and 1004 formed directly on the lower-layer waveguides 702 and 704. The waveguides 1002 and 1004 may be formed by any appropriate mechanism, including the formation of a mask followed by a liquid etch or reactive ion etching. The lower-layer waveguides correspond to waveguide portions 204 and 210 above. As such, the widths of the upper portions of the waveguides 1002 and 1004 may vary.

Figure 11:
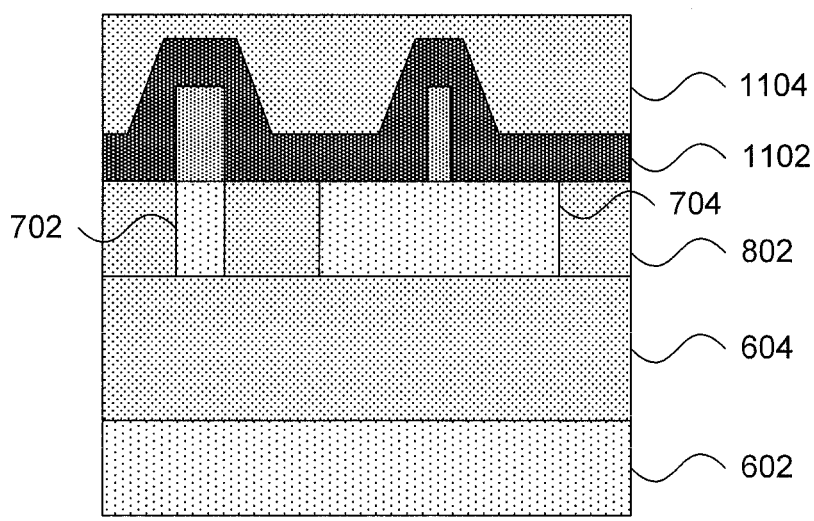
FIG. 11 is a cross-sectional diagram of a step in the formation of a polarization splitter in accordance with the present principles.

Referring now to FIG. 11, a cross-sectional view of a step in forming a polarization splitter is shown. An insulator layer 1102 is formed over the upper and lower waveguide portions 702, 704, 1002, and 1004. It is specifically contemplated that a silicon nitride may be used as the insulator layer 1102, but it should be recognized that any appropriate hardmask material may be used. The insulator layer 1102 may be formed by any appropriate deposition, including low-pressure chemical vapor deposition, rapid thermal chemical vapor deposition, sputtering, or plasma-enhanced chemical vapor deposition. A further passivating layer 1104 may be deposited over the insulator layer 1102 and may be formed from, e.g., silicon dioxide or any other suitable insulator.

Figure 12:
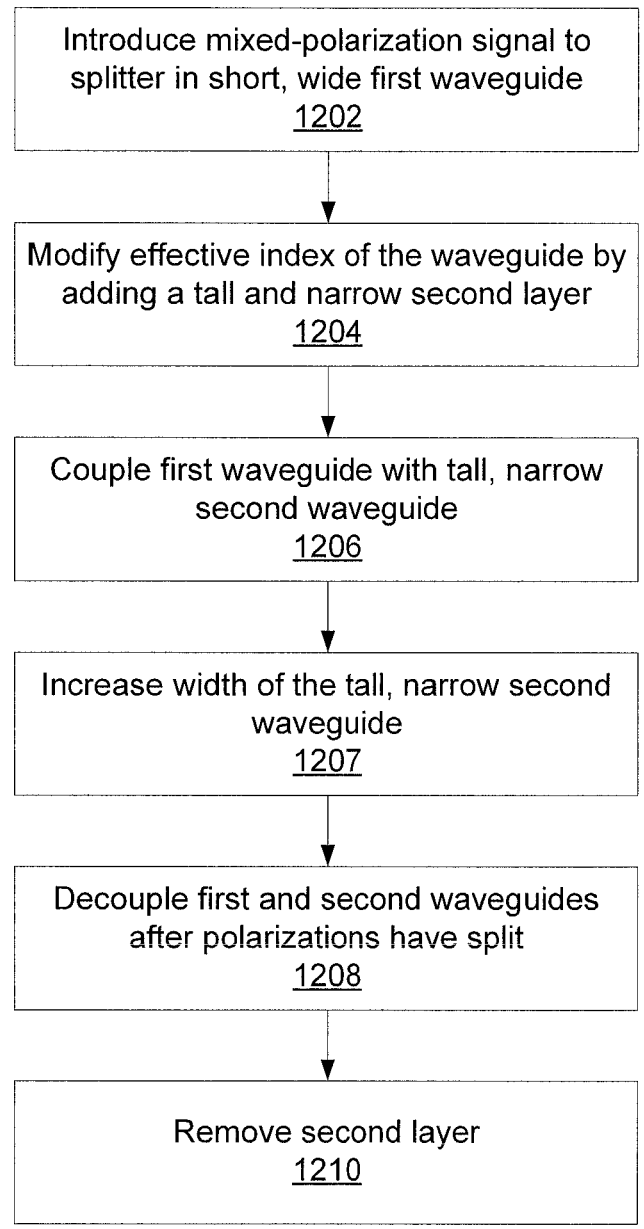
FIG. 12 is a block/flow diagram of a method for splitting polarizations in accordance with the present principles.

Referring now to FIG. 12, a method for splitting polarizations is shown. Block 1202 introduces a mixed-mode signal to a splitter 300 using a short, wide waveguide 212. In one specific embodiment, the input signal is infrared light in a range between about 1200 nm and about 1650 nm, with a preferred range between about 1260 nm and about 1360 nm. Block 1204 modifies the effective refractive index of the waveguide by introducing a narrow second layer 210. This is done gradually to avoid mixing between the modes, which would generate unwanted crosstalk.

Block 1206 couples the waveguide 208 with a tall, narrow waveguide 202. The waveguides are brought close to one another. The width of the tall, narrow waveguide 202 is slowly increased in block 1207. At a given point in the increasing width of the tall, narrow waveguide 202, it becomes more favorable to the transmission of the TM mode, the TM mode begins to propagate in that waveguide instead. Coupling takes place over a transmission length where the two waveguides 202 and 208 do not touch. Block 1208 then decouples the two waveguides 202 and 208 after the polarizations have split, moving them farther apart from one another. Block 1210 then removes the second layer 210 from the short, wide waveguide 212. Two signals leave the splitter 300, with the TM mode leaving in the tall, narrow waveguide 202 and the TE mode leaving in the short, wide waveguide 208.

Figure 13:
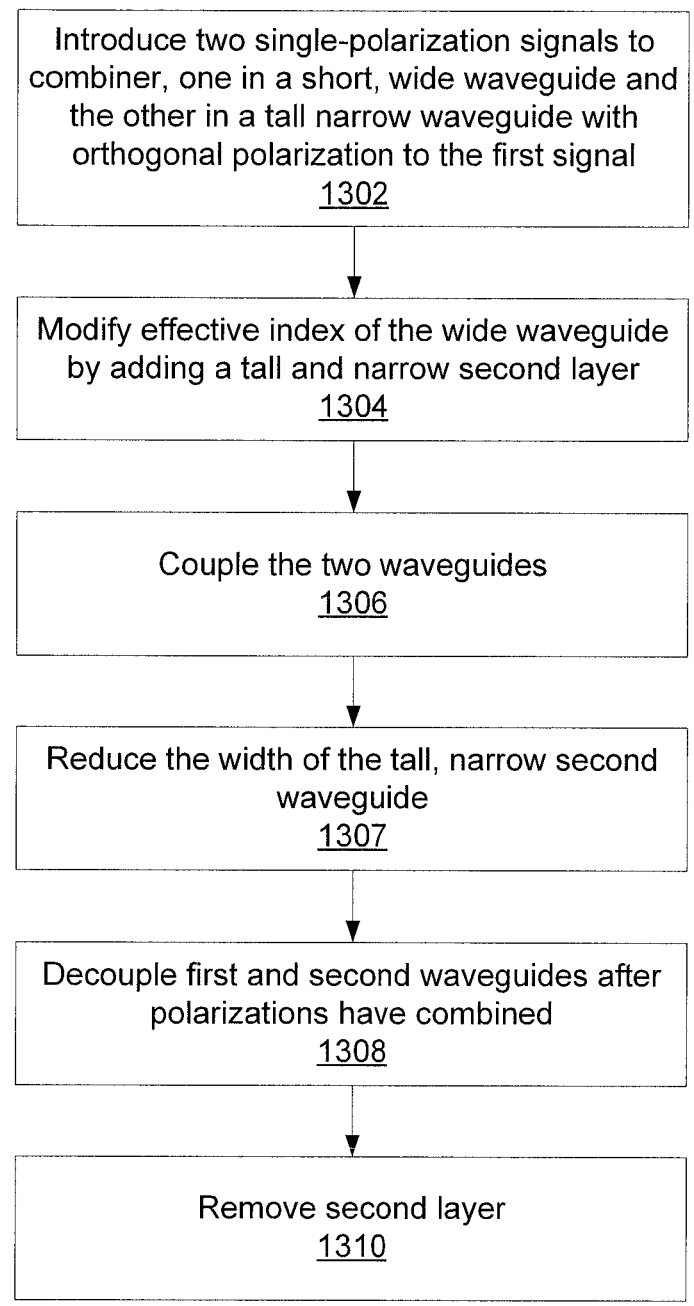
FIG. 13 is a block/flow diagram of a method for combining polarizations in accordance with the present principles.

Referring now to FIG. 13, a method for combining polarizations is shown. Block 1302 introduces two single-mode signals to a combiner 300, with a TM mode in a tall, narrow waveguide 202 and a TE mode in a short, wide waveguide 212. In one specific embodiment, the input signals are infrared light in a range between about 1200 nm and about 1650 nm, with a preferred range between about 1260 nm and about 1360 nm. Block 1304 modifies the effective index of the short, wide waveguide 212 with a narrow second layer 210.

Block 1306 couples the two waveguides 202 and 208 by bringing them close to one another without touching. Coupling takes place over a transmission length where the two waveguides 202 and 208 do not touch, during which time the tall, narrow waveguide 202 narrows further in block 1307. This makes the two-layer waveguide 208 more favorable for propagation of the TM mode, so the TM mode changes over to the two-layer waveguide 208. Block 1308 decouples the two waveguides 202 and 208 after the polarizations have combined and block 1304 removes the second layer 210. Addition and removal of the second layer 210 is done gradually to prevent mixing and crosstalk between the signals.

Having described preferred embodiments of a rebalanced adiabatic optical polarization splitter (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A polarization splitter/combiner, comprising:
 a first waveguide having a direction of propagation in a first direction, wherein a height of the first waveguide is greater than a width of the first waveguide;
 a second waveguide, disposed in proximity to the first waveguide and having a direction of propagation substantially parallel to the first direction in an interaction region, said second waveguide comprising:
  a first portion, wherein a height of the first portion is greater than a width of the first portion;
  a second portion, wherein a width of the second portion is greater than a height of the second portion; and
  a layer of insulator material directly between the first and second portion.

2. The polarization splitter of claim 1, wherein the width of the first waveguide increases in the interaction region.

3. The polarization splitter of claim 1, wherein the first and second waveguides are each formed from two layers.

4. The polarization splitter of claim 3, wherein a bottom layer of the first and second waveguides is formed from crystalline silicon and a top layer of the first and second waveguides is formed from polysilicon.

5. The polarization splitter of claim 1, wherein the first waveguide comprises a first portion disposed over a second portion, the first portion having a width that is smaller than a width of the second portion before the interaction region and increases to equal the width of the second portion in the interaction region.

6. The polarization splitter of claim 5, wherein the first portion of the first waveguide has a width that is smaller than the width of the first portion of the second waveguide at one end of the interaction region and a width that is larger than the width of the second waveguide at an opposite end of the interaction region.

7. The polarization splitter of claim 1, wherein the second waveguide carries signals having two modes, one of which moves to the first waveguide in the interaction region.

8. A method for forming a polarization splitter/combiner, comprising:
 forming a lower layer of a first and second waveguide on a substrate;
 forming a dielectric layer around and over the lower layer of the first and second waveguide;
 forming an upper layer of the first and second waveguide on the respective lower layer of the first and second waveguide,
 wherein the combined height of the lower and upper layer of the first waveguide is greater than a width of the first waveguide, and
 wherein the upper layer of the second waveguide has a substantially smaller width than a width of the lower layer of the second waveguide.

9. The method of claim 8, wherein a width of the first waveguide increases in the interaction region.

10. A polarization splitter/combiner, comprising:
 a first waveguide, the first waveguide having a direction of propagation in a first direction, wherein a height of the first waveguide is greater than a width of the first waveguide, comprising a bottom layer formed from crystalline silicon and a top layer formed from polysilicon;
 a second waveguide formed from two layers, the second waveguide being disposed in proximity to the first waveguide and having a direction of propagation substantially parallel to the first direction in an interaction region, said second waveguide comprising:
  a bottom layer formed from crystalline silicon; and
  a top layer formed from polysilicon,
 wherein the second waveguide further comprises a first portion and a second portion, the height of the first portion being greater than a width of the first portion and a width of the second portion being greater than a height of the second portion.

11. The polarization splitter of claim 10, wherein the width of the first waveguide increases in the interaction region.

12. The polarization splitter of claim 10, wherein the first portion is in direct contact with the second portion.

13. The polarization splitter of claim 10, wherein a layer of insulator material is directly between the first and second portion.

14. The polarization splitter of claim 10, wherein the first and second waveguides are each formed from two layers.

15. The polarization splitter of claim 14, wherein a bottom layer of the first and second waveguides is formed from crystalline silicon and a top layer of the first and second waveguides is formed from polysilicon.

16. The polarization splitter of claim 10, wherein the first waveguide comprises a first portion disposed over a second portion, the first portion having a width that is smaller than a width of the second portion before the interaction region and increases to equal the width of the second portion in the interaction region.

17. The polarization splitter of claim 16, wherein the first portion of the first waveguide has a width that is smaller than the width of the first portion of the second waveguide at one end of the interaction region and a width that is larger than the width of the second waveguide at an opposite end of the interaction region.

18. A polarization splitter/combiner, comprising:
a first waveguide having a direction of propagation in a first direction, wherein a height of the first waveguide is greater than a width of the first waveguide, said first waveguide comprising:
  a first portion; and
  a second portion disposed under the first portion, the first portion having a width that is smaller than a width of the second portion before the interaction region and increases to equal the width of the second portion in the interaction region;
a second waveguide, disposed in proximity to the first waveguide and having a direction of propagation substantially parallel to the first direction in an interaction region, said second waveguide comprising:
  a first portion, wherein a height of the first portion is greater than a width of the first portion; and
  a second portion, wherein a width of the second portion is greater than a height of the second portion.

19. The polarization splitter of claim 18, wherein the first portion of the first waveguide has a width that is smaller than the width of the first portion of the second waveguide at one end of the interaction region and a width that is larger than the width of the second waveguide at an opposite end of the interaction region.

* * * * *